Oct. 4, 1932.  M. K. ECKERT  1,880,919
HEADLIGHT SET
Filed Oct. 7, 1930
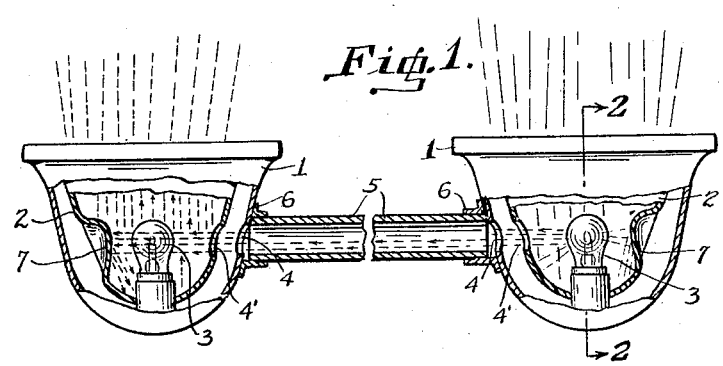
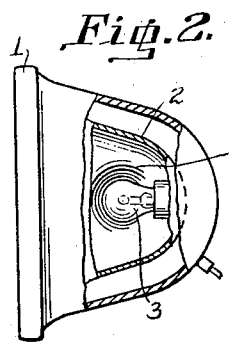
Inventor
M. K. Eckert
By Mason Fenwick Lawrence
Attorneys Patented Oct. 4, 1932

1,880,919

UNITED STATES PATENT OFFICE

MARK K. ECKERT, OF GETTYSBURG, PENNSYLVANIA

HEADLIGHT SET

Application filed October 7, 1930. Serial No. 487,071.

This invention relates to headlights for automobiles and other vehicles, and more particularly to a device adapted to afford automatic relief in cases where one or the other of the sources of illumination for the headlights has become extinguished accidentally.

An object of the present invention is to provide a device to permit the illumination of both of two headlights from one source of light in one headlight where the normal source of light in the other headlight is accidentally extinguished.

A further object of the present invention is to provide a device in which the headlight reflectors are slightly modified to permit the maximum illumination from a headlight whose source of illumination has been accidentally extinguished by means of light rays from the source of light in the other headlight.

A further object of the invention is to provide a device of the character indicated of an improved and simplified structure lending itself to the further function of bracing, steadying and maintaining the headlights in proper alignment.

Further objects of the invention will more particularly appear in the course of the following detailed description.

The invention consists in the novel construction, arrangement and combinations of parts hereafter more particularly described and claimed.

One sheet of drawing accompanies this specification as part thereof in which like reference characters indicate like parts throughout.

Figure 1 is a top plan view partly broken away illustrating one modified form of the reflector;

Figure 2 is a vertical cross-section on line 2—2 of Figure 1.

Referring to the drawing, numeral 1 indicates an automobile headlight which may be of any standard type having a reflector 2 and a source of light 3. As is customary, these headlights are arranged in pairs one on each side of the vehicle and are each mounted on the frame of the vehicle by any suitable means as is ordinary, and not here illustrated.

In accordance with the present invention, apertures 4 are provided in the side wall of the casing 1 of each headlight toward the vehicle and similar apertures 4' are provided in each reflector adjacent and in alinement with the apertures 4. The electric lamps 3 providing the illumination, are mounted in the headlights in alinement with the apertures 4—4', and the two headlights are connected by a tubular member 5 which may be connected to the casing of each headlight as by a flange connection 6 or in any other suitable manner. Preferably the tubular member 5 will be of metal or other rigid material and the flange connection 6 will be rigid so that the tubular member 5 will function as a brace connection between the two headlights and tend to maintain same in correct alinement.

By reason of the construction thus described, it will be apparent that certain light rays from either source of illumination 3—3 will pass through tubular member 5 and in the event of either of the bulbs 3 being extinguished rays from the other bulb will pass through the tubular member and be reflected from the reflector of the headlight in which the bulb is inoperative.

To improve the efficiency of the device, the headlight reflectors 2 may be modified in their outer side in alignment with the tubular member 5 to magnify and reflect most efficiently the rays of light directed thereon through the tubular passage. This modification may be by way of a convex formation or indentation 7 as illustrated in Figure 1, or it may be, if preferred, by a proper concave formation. The proper optical curves for these modified reflector surfaces will be readily ascertainable for any particular reflector by well known optical laws.

Various modifications in the precise construction and arrangement of parts will readily suggest themselves to those skilled in the art, but all of which are within the scope of the invention as claimed. Obviously, the invention is not restricted to headlights on vehicles, but is of general application wherever lights are positioned in such manner as to permit its application.

Having thus described my invention what I claim is:

In combination, two headlights each comprising: a casing, a reflector and a source of light, a straight tubular member connecting said casings and communicating through suitable orifices in said casings and reflectors with the axis of the tube in alignment with the sources of light, each of said reflectors having a sharply convex protuberance directed toward said tube and on the side opposed to said tube and forming an auxiliary reflector.

In testimony whereof I affix my signature.

MARK K. ECKERT.